Figure 1:
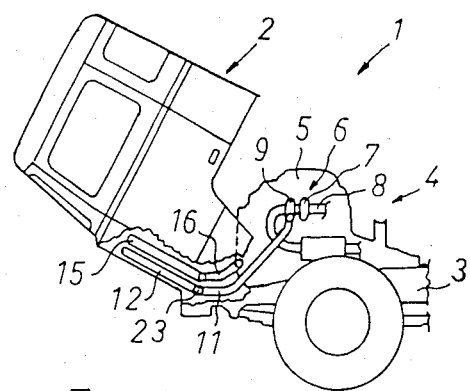

United States Patent [19]

Gadefelt et al.

[11] Patent Number: 4,505,348

[45] Date of Patent: Mar. 19, 1985

[54] ARRANGEMENT IN A HEAVY MOTOR VEHICLE TO ACHIEVE RELATIVE ROTATION IN A CONDUIT CONNECTION

[75] Inventors: Bengt G. Gadefelt; Birger S. I. Enlund, both of Södertälje, Sweden

[73] Assignee: Saab-Scania Aktiebolag, Sweden

[21] Appl. No.: 449,778

[22] Filed: Dec. 14, 1982

[30] Foreign Application Priority Data

Dec. 22, 1981 [SE] Sweden .................................. 8107692

[51] Int. Cl.$^3$ .............................................. B62D 33/06
[52] U.S. Cl. .................................. 180/89.14; 123/563; 180/68.4
[58] Field of Search ............... 180/89.14, 89.15, 89.18, 180/69.2, 69.21, 68.1, 68.2, 68.3, 68.4, 68.6; 60/599; 123/563

[56] References Cited

U.S. PATENT DOCUMENTS

| | | | |
|---|---|---|---|
| 2,100,490 | 11/1937 | Rippingille | 180/68.4 |
| 2,912,057 | 11/1959 | Wagner | 180/89.15 |
| 3,051,259 | 8/1962 | Lorenz | 180/89.14 |
| 3,334,704 | 8/1967 | Gehrke et al. | 180/68.4 |
| 4,236,492 | 12/1980 | Tholen | 123/563 |

*Primary Examiner*—Joseph F. Peters, Jr.
*Assistant Examiner*—Joseph G. McCarthy
*Attorney, Agent, or Firm*—Ostrolenk, Faber, Gerb & Soffen

[57] ABSTRACT

An arrangement in a heavy motor vehicle affords relative rotation in a conduit connection for intake air from a supercharger via a charge air cooler to the combustion engine. The supercharger and the engine are fixed to the vehicle frame, while a body unit covering the engine is tiltably mounted relative said frame. For easy access to the drive unit, the charge air cooler is fixed to the tiltably mounted body unit. For tight and strong conduit connections between charge air cooler and supercharger or engine, at least one connection has two cooperating conduit ends joined to each other to form a swivel joint permitting relative rotation between said ends about their common center line.

8 Claims, 3 Drawing Figures

U.S. Patent  Mar. 19, 1985  4,505,348

ARRANGEMENT IN A HEAVY MOTOR VEHICLE TO ACHIEVE RELATIVE ROTATION IN A CONDUIT CONNECTION

The present invention relates to an arrangement in a heavy motor vehicle to achieve relative rotation in a conduit connection through which intake air is supplied, via a supercharger and a charge air cooler, to the combustion engine of the vehicle. The engine and the supercharger are fixed to the vehicle frame or the like, while a body unit covering the engine, i.e. an engine hood or a cab, is tiltably mounted relative to said frame.

In vehicles of the type in question, in trucks for example, it is known to mount the charge air cooler in front of the radiator of the engine cooling system. The radiator and the cooler are both securely mounted to the vehicle frame, which makes installation of conduits both simple and inexpensive. Such an installation does however decrease access to the engine and the cooler for service and repairs.

To improve access it is known in trucks to mount the coolant radiator tiltable relative to the vehicle frame. The radiator is usually fixed to a body unit which is tiltable forward relative to the vehicle frame, for example a cab or hood. This means that the radiator can accompany the body unit as it tilts, thus making the engine easily accessible. Fixing the radiator to the body unit also makes it possible to have a larger radiator than would be the case if the body unit must swing clear of a radiator securely fixed to the vehicle frame.

The purpose of the present invention is, in a vehicle equipped with a supercharged engine and a coolant radiator tiltable relative to the vehicle frame, to provide charge air cooling without sacrificing the above-mentioned advantages of an arrangement with a tiltable radiator. In this respect, the invention is characterized in that the charge air cooler is fixed relative to the tiltable body unit and that conduits connecting the charge air cooler to the supercharger and to the engine respectively have at least two cooperating conduit ends connected to each other to form a swivel joint which permits relative rotation between said ends about a center line common to said conduit ends.

By virtue of the inventive solution, the charge air cooler can accompany the body unit as it tilts, thus preserving access to the engine. According to the inventive idea, at least one swivel joint is made in the conduits, said swivel joint being both wear-resistant and providing a reliable seal.

Figure 2:
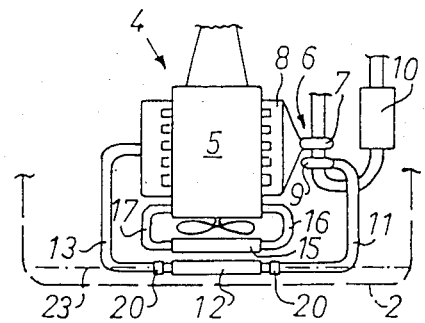
Figure 3:
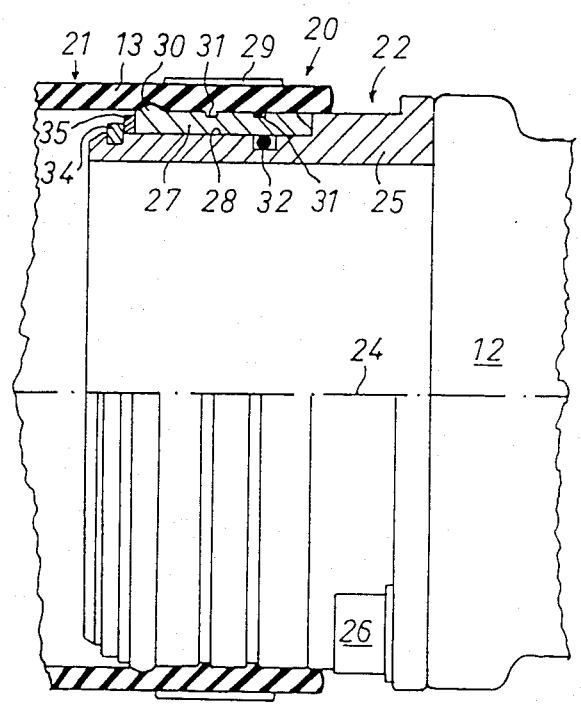

Other features characterizing the invention are revealed in the attached claims and in the description below, the latter with reference to the accompanying figures, of which FIG. 1 shows a side view of a so-called cab-over-engine truck with a tiltable cab and which is equipped with an arrangement according to the invention, FIG. 2 shows a plane view from above of a supercharged engine provided with charge air cooling in a vehicle according to FIG. 1, and FIG. 3 shows a longitudinal section of a swivel joint made according to the invention.

FIG. 1 shows a truck 1 with a tiltable cab 2 in its forwardly tilted position. In the usual manner, a drive unit 4 is fixed to the vehicle frame 3, said unit including a combustion engine 5 with a turbo supercharger 6. The supercharger 6 comprises a turbine 7 in the engine exhaust system 8. The turbine 7 drives a compressor 9 which is supplied with air via an air-cleaning filter 10 and which feeds the air in turn to the engine 5 via a conduit 11 and a so-called charge air cooler 12. In the charge air cooler 12, engine intake air is cooled by outer air flowing through the cooler 12, before the intake air is fed via a conduit 13 to the cylinders (not shown) of engine 5.

The charge air cooler 12 is placed in front of a radiator 15 in the cooling system of engine 5, which is arranged in a known manner to conduct coolant via hoses 16,17 to and from the engine 5. Both the radiator 15 and the charge air cooler 12 are mounted in a conventional manner on the tiltable cab 2 by means of bolt fastenings (not shown). The connections 11,13 and 16,17 respectively of the charge air cooler 12 and the radiator 15 respectively to the drive unit 4 fixed to the vehicle frame 3 are made to be able to absorb the relative movements occurring when the cab 2 is tilted. Each of the ingoing and outgoing conduits 11,13 of the charge air cooler 12 are provided with a swivel joint 20 which permits relative rotation between two conduit ends 21,22 joined by the swivel joint 20. Thus said conduits 11,13 are disposed, in some section at least, so that the geometric axis 23 about which the cab 2 is rotated when tilted is near the center line 24 of the conduit 11,13. This section can, as is shown in FIG. 3, be situated adjacent to a pipe stub 25 mounted on the outlet of the charge air cooler 12. This pipe stub 25, which in this case is made of cast iron, is fixed to the charge air cooler 12 by means of a number of axial bolts 26, of which only one is shown in FIG. 3. One end 21 of the conduit 13, in the form of a hose, made of silicon rubber for example, is connected to the pipe stub 25.

Relative rotation between the hose 13 and the pipe stub 25 is accomplished via a carrier ring 27, which is suitably made of a teflon-coated steel material. The carrier ring 27 is slidably mounted on a bearing surface 28, also teflon-coated, on the pipe stub 25. The carrier ring 27 and the hose 13 are pressed into tight contact with each other with the aid of a hose clamp 29. A bead 30 and two grooves 31 in the carrier ring 27 prevent any axial displacement in the joint. An O-ring 32 in a groove in the bearing surface 28 is arranged to seal against the carrier ring 27. There is also a snap ring 34 which, together with a slide ring 35 of teflon plastic, prevents the carrier ring 27 from moving axially.

In the example described, the inner conduit end is made in such a manner that its bearing capacity and rigidity are sufficient to carry the outer conduit end mounted on the same. Furthermore, the bearing surface on the outer lateral surface of the inner conduit end is adapted so as to provide a tight and easily rotatable bearing for the two conduit ends relative to each other.

The example described above does not limit the applications of the invention. Rather, the invention can be modified, within the scope of the attached claims, in a number of embodiments. It is not necessary that the center line of the swivel joint coincide with the axis of rotation for the tilting cab, especially if one conduit is flexible, as is the case if it is made of rubber. In this case, the flexibility of the rubber hose can permit a substantial distance between said center line and the axis of rotation, without sacrificing any capacity of the conduit to absorb relative movement when the body unit is tilted without risk of breakdown.

What we claim is:

1. An arrangement for supplying air to a motor vehicle combustion engine, comprising:

a charge air cooler mounted in a fixed position relative to a tiltable body unit of a motor vehicle, the body unit being tiltably mounted relative to a frame of the motor vehicle;

a first conduit for connecting a supercharger on the frame to the charge air cooler for supplying air to the charge air cooler; and a second conduit for connecting the charge air cooler to an engine on the frame for supplying air from the charge air cooler to the engine;

a pipe end mounted to the charge air cooler and extending from the charge air cooler about a respective center line;

one of the first and second conduits comprising a flexible hose having a hose end connected to the pipe end and rotatable relative to the pipe end about the respective center line for forming a swivel joint together with the pipe end.

2. The arrangement of claim 1 in which one of the pipe end and the hose end has an outer lateral surface disposed toward the other of the pipe end and the hose end, the other of the pipe end and the hose end having an inner lateral surface disposed toward the outer lateral surface, the arrangement further comprising a carrier ring between the inner and outer lateral surfaces, the carrier ring being non-rotatably mounted relative to the inner lateral surface and rotatably mounted relative to the outer lateral surface.

3. The arrangement of claim 2, further comprising an external clamping means for pressing the other of the pipe end and the hose end into contact against the carrier ring.

4. The arrangement of claim 3 in which the external clamping means is a hose clamp.

5. The arrangement of claim 1 in which the first conduit comprises the first-mentioned flexible hose having said first-mentioned hose end, the arrangement further comprising a second pipe end like the first-mentioned pipe end mounted to the charge air cooler and extending from the charge air cooler about a respective center line, the second conduit comprising a second flexible hose having a second hose end connected to the second pipe end and rotatable relative thereto about the respective center line for forming a second swivel joint like the first-mentioned swivel joint, both the respective center lines of the first and second pipe ends lying in the vicinity of an axis about which the body unit is tiltable relative to the frame.

6. The arrangement of claim 2 in which the first conduit comprises the first-mentioned flexible hose having said first-mentioned hose end, the arrangement further comprising a second pipe end like the first-mentioned pipe end mounted to the charge air cooler and extending from the charge air cooler about a respective center line, the second conduit comprising a second flexible hose having a second hose end connected to the second pipe end and rotatable relative thereto about the respective center line for forming a second swivel joint like the first-mentioned swivel joint, both the respective center lines of the first and second pipe ends lying in the vicinity of an axis about which the body unit is tiltable relative to the frame.

7. The arrangement of claim 3 in which the first conduit comprises the first-mentioned flexible hose having said first-mentioned hose end, the arrangement further comprising a second pipe end like the first-mentioned pipe end mounted to the charge air cooler and extending from the charge air cooler about a respective center line, the second conduit comprising a second flexible hose having a second hose end connected to the second pipe end and rotatable relative thereto about the respective center line for forming a second swivel joint like the first-mentioned swivel joint, both the respective center lines of the first and second pipe ends lying in the vicinity of an axis about which the body unit is tiltable relative to the frame.

8. The arrangement of claim 4 in which the first conduit comprises the first-mentioned flexible hose having said first-mentioned hose end, the arrangement further comprising a second pipe end like the first-mentioned pipe end mounted to the charge air cooler and extending from the charge air cooler about a respective center line, the second conduit comprising a second flexible hose having a second hose end connected to the second pipe end and rotatable relative thereto about the respective center line for forming a second swivel joint like the first-mentioned swivel joint, both the respective center lines of the first and second pipe ends lying in the vicinity of an axis about which the body unit is tiltable relative to the frame.

* * * * *